(12) United States Patent
Ishikawa et al.

(10) Patent No.: US 10,651,462 B2
(45) Date of Patent: May 12, 2020

(54) POSITIVE ELECTRODE ACTIVE MATERIAL CONTAINING LITHIUM COMPOSITE OXIDE AND COVERING MATERIAL, AND BATTERY INCLUDING POSITIVE ELECTRODE ACTIVE MATERIAL

(71) Applicant: Panasonic Intellectual Property Management Co., Ltd., Osaka (JP)

(72) Inventors: Takayuki Ishikawa, Osaka (JP); Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/039,305

(22) Filed: Jul. 18, 2018

(65) Prior Publication Data

US 2019/0036113 A1    Jan. 31, 2019

(30) Foreign Application Priority Data

Jul. 27, 2017    (JP) .................................. 2017-145073

(51) Int. Cl.
*H01M 4/00*    (2006.01)
*H01M 4/36*    (2006.01)
(Continued)

(52) U.S. Cl.
CPC ........ *H01M 4/366* (2013.01); *C01G 45/1228* (2013.01); *C01G 51/50* (2013.01);
(Continued)

(58) Field of Classification Search
CPC ........... H01M 4/366; H01M 2004/028; H01M 4/5825; H01M 10/0525; H01M 4/525;
(Continued)

(56) References Cited

U.S. PATENT DOCUMENTS 6,627,351 B1    9/2003  Yamaura
9,570,734 B2 †  2/2017  Kelder
(Continued)

FOREIGN PATENT DOCUMENTS

JP    2000-243394    9/2000
JP    2000-348722    12/2000
(Continued)

*Primary Examiner* — Cynthia H Kelly
*Assistant Examiner* — Monique M Wills
(74) *Attorney, Agent, or Firm* — McDermott Will & Emery LLP

(57) ABSTRACT

A positive electrode active material contains a lithium composite oxide and a covering material. The lithium composite oxide contains at least one element selected from the group consisting of fluorine, chlorine, nitrogen, and sulfur. The lithium composite oxide has a crystal structure that belongs to space group C2/m. The ratio $I_{(003)}/I_{(104)}$ of a first integrated intensity $I_{(003)}$ of a first peak corresponding to a (003) plane to a second integrated intensity $I_{(104)}$ of a second peak corresponding to a (104) plane in an XRD pattern of the lithium composite oxide satisfies $0.05 \leq I_{(003)}/I_{(104)} \leq 0.90$. The covering material has an electron conductivity of $10^6$ S/m or less.

18 Claims, 4 Drawing Sheets

(51) Int. Cl.
| | |
|---|---|
| *H01M 4/505* | (2010.01) |
| *H01M 4/58* | (2010.01) |
| *H01M 4/525* | (2010.01) |
| *H01M 4/485* | (2010.01) |
| *C01G 45/12* | (2006.01) |
| *C01G 51/00* | (2006.01) |
| *H01M 4/62* | (2006.01) |
| *C01G 53/00* | (2006.01) |
| *H01M 4/02* | (2006.01) |
| *H01M 10/0525* | (2010.01) |

(52) U.S. Cl.
CPC ............ *C01G 53/50* (2013.01); *H01M 4/485* (2013.01); *H01M 4/505* (2013.01); *H01M 4/525* (2013.01); *H01M 4/5825* (2013.01); *H01M 4/62* (2013.01); *C01P 2002/72* (2013.01); *C01P 2002/74* (2013.01); *C01P 2002/76* (2013.01); *C01P 2004/80* (2013.01); *C01P 2004/84* (2013.01); *H01M 10/0525* (2013.01); *H01M 2004/028* (2013.01); *H01M 2300/0068* (2013.01); *H01M 2300/0071* (2013.01)

(58) Field of Classification Search
CPC .................. H01M 4/485; H01M 4/62; H01M 2300/0068; C01P 2004/84
See application file for complete search history.

(56) References Cited

U.S. PATENT DOCUMENTS

| | | |
|---|---|---|
| 2011/0099798 A1 † | 5/2011 | Nilsen |
| 2011/0294006 A1 † | 12/2011 | Amine |
| 2011/0311882 A1 † | 12/2011 | Kim |
| 2013/0168599 A1 | 7/2013 | Kato et al. |
| 2013/0209871 A1 | 8/2013 | Kato et al. |
| 2015/0380737 A1 | 12/2015 | Kawasato et al. |
| 2016/0351973 A1 † | 12/2016 | Albano |
| 2016/0380263 A1 * | 12/2016 | Nakayama ............ H01M 4/366 429/223 |
| 2017/0069907 A1 * | 3/2017 | Zhu ..................... H01M 4/0435 |

FOREIGN PATENT DOCUMENTS

| | | |
|---|---|---|
| JP | 2012-038562 | 2/2012 |
| JP | 2012-038564 | 2/2012 |
| JP | 2016-026981 | 2/2016 |
| WO | 2017/143329 A1 † | 8/2017 |

\* cited by examiner
† cited by third party

POSITIVE ELECTRODE ACTIVE MATERIAL CONTAINING LITHIUM COMPOSITE OXIDE AND COVERING MATERIAL, AND BATTERY INCLUDING POSITIVE ELECTRODE ACTIVE MATERIAL

BACKGROUND

1. Technical Field

The present disclosure relates to a positive electrode active material for batteries and a battery.

2. Description of the Related Art

Japanese Unexamined Patent Application Publication No. 2016-26981 discloses a lithium-containing composite oxide containing Li, Ni, Co, and Mn as essential components. The lithium-containing composite oxide has a crystal structure which belongs to space group R-3m and in which the c-axis lattice constant is 14.208 to 14.228 Å and the a-axis lattice constant and the c-axis lattice constant satisfy $3a+5.615 \leq c \leq 3a+5.655$. Furthermore, the integrated intensity ratio ($I_{003}/I_{104}$) of a peak of (003) to a peak of (104) in an XRD pattern is 1.21 to 1.39.

SUMMARY

In one general aspect, the techniques disclosed here feature a positive electrode active material including: a lithium composite oxide containing at least one element selected from the group consisting of fluorine, chlorine, nitrogen, and sulfur; and a covering material that covers a surface of the lithium composite oxide. The covering material has an electron conductivity of $10^6$ S/m or less. The lithium composite oxide has a crystal structure that belongs to space group C2/m. The ratio $I_{(003)}/I_{(104)}$ of a first integrated intensity $I_{(003)}$ of a first peak corresponding to a (003) plane to a second integrated intensity $I_{(104)}$ of a second peak corresponding to a (104) plane in an XRD pattern of the lithium composite oxide satisfies $0.05 \leq I_{(003)}/I_{(104)} \leq 0.90$.

General or specific embodiments of the present disclosure may be implemented as a positive electrode active material for batteries, a battery, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
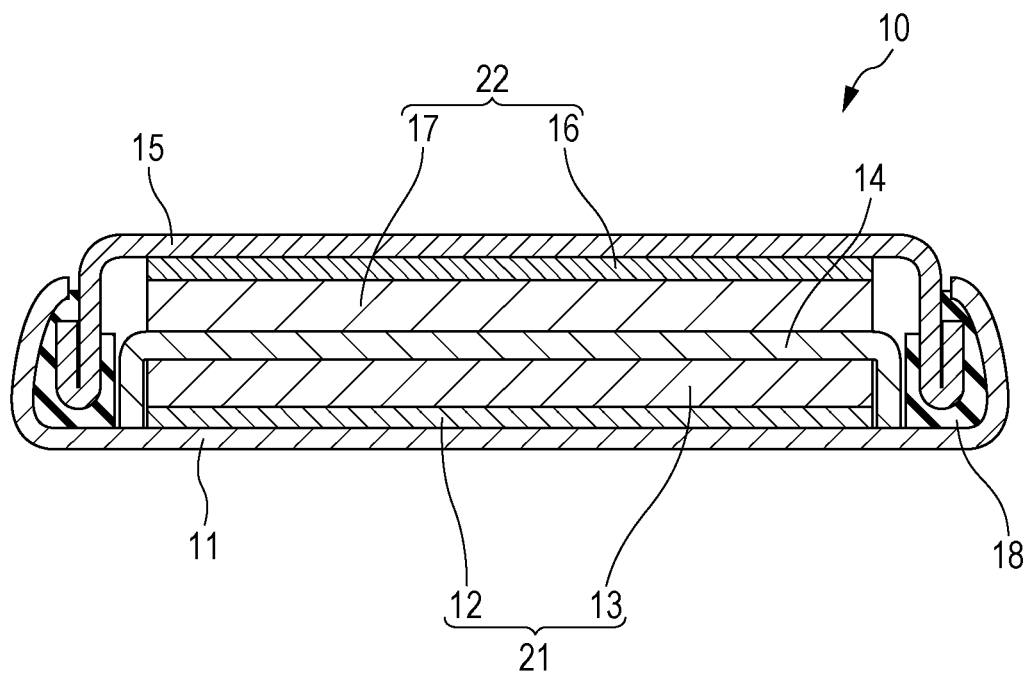
FIG. 1 is a sectional view illustrating a schematic structure of a battery that is an example of a battery according to a second embodiment.

Hereafter, embodiments of the present disclosure will be described.

First Embodiment

A positive electrode active material according to a first embodiment contains a lithium composite oxide containing at least one element selected from the group consisting of F, Cl, N, and S and a covering material that covers a surface of the lithium composite oxide and has an electron conductivity of $10^6$ S/m or less. The lithium composite oxide has a crystal structure that belongs to space group C2/m, and an integrated intensity ratio $I_{(003)}/I_{(104)}$ of a peak of a (003) plane to a peak of a (104) plane in an XRD pattern of the lithium composite oxide satisfies $0.05 \leq I_{(003)}/I_{(104)} \leq 0.90$.

This configuration can provide batteries having good cycle characteristics.

The term "batteries having good cycle characteristics" refers to batteries having a high capacity retention even after a charge-discharge cycle is repeatedly performed a plurality of times. In other words, the batteries having good cycle characteristics are batteries whose capacity does not considerably decrease even after a charge-discharge cycle is repeatedly performed a plurality of times.

In the case where, for example, a lithium ion battery is produced using the positive electrode active material according to the first embodiment, the lithium ion battery has an oxidation-reduction potential (based on Li/Li$^+$) of about 3.5 V. In the lithium ion battery, the capacity retention after 20 cycles of a charge-discharge test is about 80% or more.

The lithium composite oxide according to the first embodiment contains one or more elements selected from the group consisting of F, Cl, N, and S. By partly replacing oxygen with an anion that is electrochemically inactive, the crystal structure is believed to be stabilized. Therefore, it is believed that the discharge capacity or operating voltage of the battery are improved, which increases the energy density.

In the case where the lithium composite oxide does not contain, for example, one or more elements selected from the group consisting of F, Cl, N, and S, the amount of oxygen used for the oxidation-reduction reaction increases. This easily destabilizes the structure through elimination of oxygen. Thus, the capacity or the cycle characteristics are degraded.

The lithium composite oxide according to the first embodiment has a crystal structure that belongs to space group C2/m, and the integrated intensity ratio $I_{(003)}/I_{(104)}$ of a peak of a (003) plane to a peak of a (104) plane in an X-ray diffraction (XRD) pattern satisfies $0.05 \leq I_{(003)}/I_{(104)} \leq 0.90$.

The ratio $I_{(003)}/I_{(104)}$ is a parameter that is an index of cation mixing in a lithium composite oxide having a crystal structure that belongs to space group C2/m. The term "cation mixing" in the present disclosure refers to a state in which a lithium atom and a cation atom such as a transition metal are replaced with each other in a crystal structure of the lithium composite oxide. As the degree of cation mixing decreases, the ratio $I_{(003)}/I_{(104)}$ increases. As the degree of cation mixing increases, the ratio $I_{(003)}/I_{(104)}$ decreases.

Since the lithium composite oxide according to the first embodiment satisfies $0.05 \leq I_{(003)}/I_{(104)} \leq 0.90$, the Li occupancy in "all of 2b sites and 4g sites" that correspond to a so-called "transition metal layer" is believed to be, for example, 25 mol % or more and less than 50 mol %. Thus, in addition to high diffusibility of Li in a Li layer, the diffusibility of Li in the "transition metal layer" is also improved. Furthermore, the diffusibility of Li between the Li layer and the "transition metal layer" is improved. Therefore, the lithium composite oxide according to the first embodiment is more suitable for producing high-capacity batteries than known ordered lithium composite oxides (i.e., the degree of cation mixing is low).

If the ratio $I_{(003)}/I_{(104)}$ of the lithium composite oxide according to the first embodiment is less than 0.05, the Li occupancy excessively increases in the "transition metal layer" and thus the crystal structure becomes thermodynamically unstable. Therefore, the crystal structure is broken when the deintercalation of Li during charge proceeds, which causes an insufficient capacity.

If the ratio $I_{(003)}/I_{(104)}$ of the lithium composite oxide according to the first embodiment is more than 0.90, the cation mixing is suppressed and thus the Li occupancy in the "transition metal layer" decreases, which reduces the number of three-dimensional diffusion paths of Li. Consequently, the diffusibility of Li degrades, which causes an insufficient capacity.

In the lithium composite oxide according to the first embodiment, $0.05 \leq I_{(003)}/I_{(104)} \leq 0.90$ is satisfied and thus the lithium atom and the cation atom such as a transition metal are believed to be sufficiently subjected to cation mixing. Therefore, it is believed that the number of three-dimensional diffusion paths of lithium increases in the lithium composite oxide according to the first embodiment. Thus, a larger amount of Li can be intercalated and deintercalated.

Since the lithium composite oxide according to the first embodiment has a crystal structure that belongs to space group C2/m and $0.05 \leq I_{(003)}/I_{(104)} \leq 0.90$ is satisfied, a transition metal-anion octahedron serving as a pillar three-dimensionally forms a network even when a large amount of Li is extracted, and thus the crystal structure can be stably maintained. Therefore, the positive electrode active material according to the first embodiment is suitable for providing high-capacity batteries. For the same reason, the positive electrode active material according to the first embodiment is also suitable for providing batteries having good cycle characteristics.

It is believed that, for example, the layered crystal structure that belongs to space group C2/m is easily maintained and is not easily broken even when a large amount of Li is extracted compared with layered structures that belong to space group R-3m.

Herein, for example, Japanese Unexamined Patent Application Publication No. 2016-26981 is taken as a comparative example. Japanese Unexamined Patent Application Publication No. 2016-26981 discloses a positive electrode active material containing a lithium composite oxide which has a crystal structure that belongs to space group R-3m and in which a lithium atom and a cation atom such as a transition metal are not sufficiently subjected to cation mixing. In the related art, it has been considered that cation mixing should be suppressed in a lithium composite oxide.

In contrast, the lithium composite oxide according to the first embodiment contains one or more elements selected from the group consisting of F, Cl, N, and S. Furthermore, the lithium composite oxide has a crystal structure that belongs to space group C2/m and the integrated intensity ratio $I_{(003)}/I_{(104)}$ of a peak of a (003) plane to a peak of a (104) plane in an XRD pattern satisfies $0.05 \leq I_{(003)}/I_{(104)} \leq 0.90$. Thus, the present inventors have realized a high-capacity battery that is beyond expectation in the related art.

When a typical positive electrode active material is used at a high potential, the decomposition (e.g., side reaction) of an electrolyte is facilitated, which generates a resistance layer. Furthermore, when a typical positive electrode active material is used at a high potential, anions contained in the positive electrode active material separate in the form of gas. This may degrade the cycle characteristics.

The positive electrode active material according to the first embodiment further contains a covering material in addition to the above-described lithium composite oxide. The covering material covers a surface of the lithium composite oxide. The covering material has an electron conductivity of $10^6$ S/m or less and is a material different from the lithium composite oxide. When the covering material covers a surface of the lithium composite oxide, the contact between the lithium composite oxide and the electrolyte is suppressed. The low electron conductivity of the covering material suppresses the transfer of electrons between the lithium composite oxide and the electrolyte, and the side reactions caused by the transfer of electrons can be suppressed. Thus, the generation of a resistance layer or the separation in the form of gas is suppressed. Therefore, batteries having good cycle characteristics can be provided.

That is, even when the positive electrode active material according to the first embodiment is used at a high potential, batteries having good cycle characteristics can be provided.

In the present disclosure, the phrase "cover a surface" includes a state in which a surface is completely covered and a state in which a surface is partly covered.

In the first embodiment, the mass ratio of the covering material to the above-described lithium composite oxide may be 0.2 or less.

This configuration can suppress the electrochemical inactivation of the surface of the positive electrode active material according to the first embodiment. This can suppress an increase in the resistance. Thus, batteries having higher capacity and better cycle characteristics can be provided.

In the first embodiment, the mass ratio of the covering material to the above-described lithium composite oxide may be 0.01 or more and 0.1 or less.

This configuration can provide batteries having higher capacity and better cycle characteristics.

This configuration can provide batteries having better cycle characteristics.

The covering material according to the first embodiment may cover a surface of the above-described lithium composite oxide with a thickness of 0.1 nm or more and 2.0 nm or less.

This configuration can provide batteries having higher capacity and better cycle characteristics.

When the covering material has a thickness of 0.1 nm or more, the uniformity of the thickness can be improved. Furthermore, when the covering material has a thickness of 0.1 nm or more, the dielectric breakdown can be suppressed.

When the covering material has a thickness of 2.0 nm or less, the inhibition of Li conduction due to the covering material can be suppressed.

The covering material according to the first embodiment may chemically modify a surface of the above-described lithium composite oxide.

The covering material according to the first embodiment may form a solid solution with at least a part of the surface of the above-described lithium composite oxide.

This configuration can provide batteries having better cycle characteristics because elution (e.g., elimination) of metal elements can be further suppressed.

The covering material according to the first embodiment is, for example, an inorganic material.

The covering material according to the first embodiment may be one or more materials selected from the group consisting of graphite, carbon black, and graphite fluoride. Examples of the carbon black include acetylene black, Ketjenblack (registered trademark), channel black, furnace black, lamp black, and thermal black.

The covering material may be an insulating compound. The covering material does not necessarily contribute to an electrochemical reaction.

The covering material according to the first embodiment may be at least one material selected from the group consisting of oxides, halogen compounds, sulfides, and phosphorus compounds.

For example, the halogen compound may be $AlF_3$.

The covering material according to the first embodiment may be a lithium ion conductor.

For example, the lithium ion conductor may be one or more materials selected from the group consisting of $LiBO_2$, $Li_3PO_4$, $LiNbO_3$, $LiNbO_2$, $LiAlO_2$, $Li_2SO_4$, $Li_2MoO_4$, $Li_4SiO_4$, $Li_4FeO_4$, $Li_4ZrO_4$, $Li_2CO_3$, $LiW_2O_7$, $Li_3VO_4$, LiCl, LiBr, LiI, $Li_2Se$, and various lithium ion conductive glasses such as $Li_2O—B_2O_3$, $Li_2O—Al_2O_3$, $Li_2O—SiO_4$, $Li_2O—P_2O_5$, $LiF—BF_3$, $LiF—AlF_3$, and $LiF—VF_3$.

This configuration can provide batteries having better cycle characteristics.

The covering material according to the first embodiment may be a Li-containing oxide having high Li conductivity.

For example, the Li-containing oxide may be one or more oxides selected from the group consisting of lithium borate, lithium niobate, lithium cobaltate, lithium titanate, and lithium aluminate.

In this configuration, the diffusibility of Li ions is improved and thus batteries having higher capacity can be provided.

When the covering material according to the first embodiment is capable of occluding Li during charge-discharge reaction, batteries having higher capacity can be provided. In this case, the covering material has a charge-discharge capacity. Therefore, even if the mass ratio of the lithium composite oxide to the entire positive electrode active material is decreased by adding the covering material, high capacity of the battery is maintained.

The covering material according to the first embodiment may be an oxide.

This configuration can provide batteries having better cycle characteristics. Oxides are chemically stable and have low reactivity with an electrolyte. Therefore, it is believed that by using oxides, the crystal structure is easily maintained in an electrochemical reaction.

The covering material according to the first embodiment may be an oxide represented by composition formula (1) below.

$$Li_aA_bO_c \qquad \text{formula (1)}$$

Herein, A may represent one or more elements selected from the group consisting of Mn, Co, Ni, Fe, Cu, Nb, Mo, Ti, Al, Cr, Zr, Zn, Na, K, Ca, Mg, Pt, Au, P, Eu, Sm, Ce, and H.

Furthermore, the following conditions may be satisfied:

$0 \leq a \leq 3$, $0.5 \leq b \leq 4$, and

$1 \leq c \leq 4$.

This configuration can provide batteries having better cycle characteristics.

The covering material according to the first embodiment may be, for example, one or more oxides selected from the group consisting of $MnO_2$, $Al_2O_3$, MgO, $ZrO_2$, ZnO, $TiO_2$, $H_3BO_3$, $Mn_2O_3$, $Fe_2O_3$, CuO, NiO, $Co_3O_4$, $Eu_2O_3$, $Sm_2O_3$, and $CeO_2$.

This configuration can provide batteries having better cycle characteristics.

The covering material according to the first embodiment may be one or more oxides selected from the group consisting of $MnO_2$, $Al_2O_3$, MgO, $LiNbO_3$, and $LiBO_2$.

This configuration can provide batteries having better cycle characteristics.

The covering material according to the first embodiment may be a transition metal oxide.

This configuration can provide batteries having better cycle characteristics.

The covering material according to the first embodiment may contain the same metal element as that contained in the above-described lithium composite oxide.

In this configuration, the metal elements firmly bond to each other through, for example, formation of a solid solution at an interface between the lithium composite oxide and the covering material. Therefore, the elution (e.g., elimination) of the metal element is suppressed. This can provide batteries having better cycle characteristics.

The lithium composite oxide according to the first embodiment may satisfy $0.11 \leq I_{(003)}/I_{(104)} \leq 0.85$.

This configuration can provide batteries having higher capacity.

The lithium composite oxide according to the first embodiment may satisfy $0.44 \leq I_{(003)}/I_{(104)} \leq 0.85$.

This configuration can provide batteries having higher capacity.

Typically, peaks of a (003) plane and a (104) plane in a CuKα XRD pattern are present at diffraction angles 2θ of 18° to 20° and 44° to 46°, respectively.

The integrated intensity of each diffraction peak can be calculated using, for example, software included with an XRD instrument (e.g., PDXL included with a powder X-ray diffraction instrument manufactured by Rigaku Corporation). In this case, the integrated intensity of each diffraction peak can be determined by, for example, calculating an area within ±3° of an angle of each diffraction peak.

The lithium composite oxide according to the first embodiment may contain F.

In this configuration, the cation-anion interaction is increased by partly replacing oxygen with F, which has a high electronegativity, thereby improving the discharge capacity or operating voltage of the battery. Furthermore, by dissolving F, which has a high electronegativity, electrons are localized compared with in the case where F is not contained. This can suppress the elimination of oxygen during charge and thus the crystal structure is stabilized. By combining these effects, batteries having higher capacity can be provided.

In the lithium composite oxide according to the first embodiment, the element constituting the above-described "transition metal layer" may be a cation atom such as a transition metal. The cation atom such as a transition metal may be, for example, one or more elements selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al.

This configuration can provide batteries having higher capacity.

The lithium composite oxide according to the first embodiment may include at least one element selected from the group consisting of Mn, Co, Ni, Fe, Cu, V, Ti, Cr, and Zn, that is, at least one 3d transition metal element.

This configuration can provide batteries having higher capacity.

The lithium composite oxide according to the first embodiment may contain Mn.

In this configuration, when the lithium composite oxide contains Mn having orbitals easily hybridized with those of oxygen, the elimination of oxygen during charge is suppressed. Thus, the crystal structure is stabilized and batteries having higher capacity can be provided.

The lithium composite oxide according to the first embodiment contains Mn and may further contain Co and Ni.

In this configuration, the crystal structure is further stabilized by adding Mn that has orbitals easily hybridized with those of oxygen, Co that produces an effect of stabilizing the structure, and Ni that produces an effect of facilitating the deintercalation of Li. This can provide batteries having higher capacity.

Next, an example of the chemical composition of the lithium composite oxide according to the first embodiment will be described.

The lithium composite oxide according to the first embodiment may be a compound represented by composition formula (2) below.

$$Li_xMe_yO_\alpha Q_\beta \qquad \text{formula (2)}$$

Herein, Me may represent one or more elements selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al.

Me may include at least one element selected from the group consisting of Mn, Co, Ni, Fe, Cu, V, Ti, Cr, and Zn, that is, at least one 3d transition metal element.

Q may represent one or more elements selected from the group consisting of F, Cl, N, and S.

Furthermore, the following conditions may be satisfied in the composition formula (2):

$1.05 \leq x \leq 1.4$, $0.6 \leq y \leq 0.95$, $1.33 \leq \alpha < 2$, and $0 < \beta \leq 0.67$.

This configuration can provide batteries having higher capacity.

In the first embodiment, when Me is constituted by two or more elements (e.g., Me' and Me") and the composition ratio is "Me'$_{y1}$Me"$_{y2}$", "y=y1+y2" is given. For example, when Me is constituted by two elements (Mn and Co) and the composition ratio is "Mn$_{0.6}$Co$_{0.2}$", "y=0.6+0.2=0.8" is given. In the case where Q is constituted by two or more elements, the calculation can be conducted in the same manner as in the case of Me.

When x is 1.05 or more in the compound represented by the composition formula (2), the amount of Li that can be used is increased. This increases the capacity.

When x is 1.4 or less in the compound represented by the composition formula (2), the oxidation-reduction reaction of Me can be more utilized. As a result, the oxidation-reduction reaction of oxygen is less utilized. Thus, the crystal structure is stabilized. This increases the capacity.

When y is 0.6 or more in the compound represented by the composition formula (2), the oxidation-reduction reaction of Me can be more utilized. As a result, the oxidation-reduction reaction of oxygen is less utilized. Thus, the crystal structure is stabilized. This increases the capacity.

When y is 0.95 or less in the compound represented by the composition formula (2), the amount of Li that can be used is increased. This increases the capacity.

When α is 1.33 or more in the compound represented by the composition formula (2), the amount of charge compensation due to the oxidation-reduction reaction of oxygen is increased. This increases the capacity.

When α is less than 2 in the compound represented by the composition formula (2), an excess increase in the capacity due to the oxidation-reduction reaction of oxygen can be prevented, which stabilizes a structure when Li is deintercalated. This increases the capacity.

When β is more than 0 in the compound represented by the composition formula (2), the structure is stabilized because of the influence of Q that is electrochemically inactive when Li is deintercalated. This increases the capacity.

When β is 0.67 or less in the compound represented by the composition formula (2), the influence of Q that is electrochemically inactive is reduced, which improves the electron conductivity. This increases the capacity.

The compound represented by the composition formula (2) may satisfy the following conditions:

$1.15 \leq x \leq 1.3$, $0.7 \leq y \leq 0.85$, $1.8 \leq \alpha \leq 1.95$, and $0.05 \leq \beta \leq 0.2$.

This configuration can provide batteries having higher capacity.

In the compound represented by the composition formula (2), the ratio of "Li" and "Me" is represented by x/y.

The compound represented by the composition formula (2) may satisfy $1.3 \leq x/y \leq 1.9$.

This configuration can provide batteries having higher capacity.

When x/y is more than 1, the ratio of the number of Li atoms at sites at which Li atoms are located is larger than that of a known positive electrode active material represented by, for example, composition formula LiMnO$_2$. This allows a larger amount of Li to be intercalated and deintercalated.

When x/y is 1.3 or more, a large amount of Li can be used and thus the diffusion paths of Li can be appropriately formed. This can provide batteries having higher capacity.

When x/y is 1.9 or less, less utilization of the oxidation-reduction reaction of Me can be prevented. As a result, the oxidation-reduction reaction of oxygen is less utilized. Furthermore, the crystal structure can be prevented from becoming unstable when Li is deintercalated during charge, and the efficiency of intercalating Li during discharge can be prevented from decreasing. This can provide batteries having higher capacity.

The compound represented by the composition formula (2) may satisfy $1.3 \leq x/y \leq 1.7$.

This configuration can provide batteries having higher capacity.

In the compound represented by the composition formula (2), the ratio of "O" and "Q" is represented by α/β.

The compound represented by the composition formula (2) may satisfy $9 \leq \alpha/\beta \leq 39$.

This configuration can provide batteries having higher capacity.

When $\alpha/\beta$ is 9 or more, the amount of charge compensation due to the oxidation-reduction reaction of oxygen can be prevented from decreasing. Furthermore, the influence of Q that is electrochemically inactive can be reduced and thus the electron conductivity is improved. This can provide batteries having higher capacity.

When $\alpha/\beta$ is 39 or less, an excess increase in the capacity due to the oxidation-reduction reaction of oxygen can be prevented, which stabilizes a structure when Li is deintercalated. Furthermore, the influence of Q that is electrochemically inactive stabilizes a structure when Li is deintercalated. This can provide batteries having higher capacity.

The compound represented by the composition formula (2) may satisfy $9 \leq \alpha/\beta \leq 19$.

This configuration can provide batteries having higher capacity.

In the compound represented by the composition formula (2), the ratio of "Li+Me" and "O+Q" (i.e., the ratio of "cation" and "anion") is represented by $(x+y)/(\alpha+\beta)$.

The compound represented by the composition formula (2) may satisfy $0.75 \leq (x+y)/(\alpha+\beta) \leq 1.2$.

This configuration can provide batteries having higher capacity.

When $(x+y)/(\alpha+\beta)$ is 0.75 or more, the generation of a large amount of impurities due to phase separation during synthesis can be prevented. This can provide batteries having higher capacity.

When $(x+y)/(\alpha+\beta)$ is 1.2 or less, a structure with a small amount of anion deficiency is formed, and thus the crystal structure is stabilized when Li is deintercalated during charge. This can provide batteries having higher capacity.

The compound represented by the composition formula (2) may satisfy $0.75 \leq (x+y)/(\alpha+\beta) \leq 1.0$.

This configuration can provide batteries having higher capacity and better cycle characteristics.

When $(x+y)/(\alpha+\beta)$ is 1.0 or less, a cation-deficient structure is formed, and thus a larger number of Li diffusion paths are formed. This can provide batteries having higher capacity. Furthermore, cation deficits are randomly arranged in an initial state, and thus the structure is not destabilized when Li is deintercalated. This can provide batteries having good cycle characteristics and a long life.

In the compound represented by the composition formula (2), Q may include F.

That is, Q may represent F.

Alternatively, Q may include F and one or more elements selected from the group consisting of Cl, N, and S.

In this configuration, the cation-anion interaction is increased by partly replacing oxygen with F, which has a high electronegativity, thereby improving the discharge capacity or operating voltage of the battery. Furthermore, by dissolving F, which has a high electronegativity, electrons are localized compared with in the case where F is not contained. This can suppress the elimination of oxygen during charge and thus the crystal structure is stabilized. By combining these effects, batteries having higher capacity can be provided.

In the compound represented by the composition formula (2), Me may include one or more elements selected from the group consisting of Mn, Co, Ni, Fe, Cu, V, Nb, Ti, Cr, Na, Mg, Ru, W, B, Si, P, and Al.

This configuration can provide batteries having higher capacity.

In the compound represented by the composition formula (2), Me may include Mn.

That is, Me may represent Mn.

Alternatively, Me may include Mn and one or more elements selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al.

In this configuration, when Me includes Mn having orbitals easily hybridized with those of oxygen, the elimination of oxygen during charge is suppressed. Thus, the crystal structure is stabilized and batteries having higher capacity can be provided.

In the compound represented by the composition formula (2), the Mn content in Me may be 60 mol % or more. That is, the molar ratio (Mn/Me ratio) of Mn to Me including Mn may be 0.6 to 1.0.

In this configuration, when Me sufficiently includes Mn having orbitals easily hybridized with oxygen, the elimination of oxygen during charge is further suppressed. Thus, the crystal structure is stabilized and batteries having higher capacity can be provided.

In the compound represented by the composition formula (2), Me includes Mn and may further include Co and Ni.

In this configuration, the crystal structure is further stabilized by adding Mn that has orbitals easily hybridized with those of oxygen, Co that produces an effect of stabilizing the structure, and Ni that produces an effect of facilitating the deintercalation of Li. This can provide batteries having higher capacity.

In the compound represented by the composition formula (2), Me may include 20 mol % or less of one or more elements selected from the group consisting of B, Si, P, and Al relative to Me.

In this configuration, the structure is stabilized by adding an element that readily forms covalent bonds, which improves the cycle characteristics. This can provide batteries having a longer life.

In the lithium composite oxide according to the first embodiment, Li may be partly replaced with an alkali metal such as Na or K.

The positive electrode active material according to the first embodiment may contain the above-described lithium composite oxide as a main component (i.e., 50% or more relative to the entire positive electrode active material on a mass basis (50 mass % or more)).

This configuration can provide batteries having higher capacity.

The positive electrode active material according to the first embodiment may contain 70% or more (70 mass % or more) of the lithium composite oxide relative to the entire positive electrode active material on a mass basis.

This configuration can provide batteries having higher capacity.

The positive electrode active material according to the first embodiment may contain 90% or more (90 mass % or more) of the lithium composite oxide relative to the entire positive electrode active material on a mass basis.

This configuration can provide batteries having higher capacity.

The positive electrode active material according to the first embodiment may further contain unavoidable impurities in addition to the above-described lithium composite oxide and covering material.

The positive electrode active material according to the first embodiment may further contain, in addition to the above-described lithium composite oxide, at least one selected from the group consisting of a starting material used when the positive electrode active material is synthesized, a by-product, and a decomposition product.

The positive electrode active material according to the first embodiment may contain only the above-described lithium composite oxide and covering material except for, for example, unavoidable impurities.

This configuration can provide batteries having higher capacity and better cycle characteristics.

Method for Producing Compound

Hereafter, an example of a method for producing a lithium composite oxide contained in the positive electrode active material according to the first embodiment will be described.

The lithium composite oxide according to the first embodiment can be produced by, for example, the following method.

A raw material containing Li, a raw material containing Me, and a raw material containing Q are provided.

Examples of the raw material containing Li include oxides such as $Li_2O$ and $Li_2O_2$; salts such as LiF, $Li_2CO_3$, and LiOH; and lithium composite oxides such as $LiMeO_2$ and $LiMe_2O_4$.

Examples of the raw material containing Me include oxides such as $Me_2O_3$, salts such as $MeCO_3$ and $MeNO_3$, hydroxides such as $Me(OH)_2$ and MeOOH, and lithium composite oxides such as $LiMeO_2$ and $LiMe_2O_4$.

For example, when Me represents Mn, examples of the raw material containing Mn include manganese oxides such as $MnO_2$ and $Mn_2O_3$, salts such as $MnCO_3$ and $MnNO_3$, hydroxides such as $Mn(OH)_2$ and MnOOH, and lithium composite oxides such as $LiMnO_2$ and $LiMn_2O_4$.

Examples of the raw material containing Q include lithium halides, transition metal halides, transition metal sulfides, and transition metal nitrides.

For example, when Q represents F, examples of the raw material containing F include LiF and transition metal fluorides.

These raw materials are weighed so as to have, for example, the molar ratio in the composition formula (2).

Thus, "x, y, $\alpha$, and $\beta$" in the composition formula (2) can be changed within the range in the composition formula (2).

The weighed raw materials are mixed with each other by, for example, a dry process or a wet process and mechanochemically reacted for 10 hours or more to obtain a compound (precursor). For example, a mixer such as a planetary ball mill can be used.

Then, the obtained compound is heat-treated. This provides a structure in which atoms are partly ordered and thus the lithium composite oxide according to the first embodiment is obtained.

The heat treatment conditions are appropriately set so that the lithium composite oxide according to the first embodiment is obtained. Although the optimum heat treatment conditions vary depending on other production conditions and the target composition, the present inventors have found that the degree of cation mixing tends to decrease as the heat treatment temperature increases or as the heat treatment time increases. Therefore, manufacturers can determine the heat treatment conditions on the basis of this tendency. The heat treatment temperature may be selected from, for example, the range of 600° C. to 900° C. and the heat treatment time may be selected from, for example, the range of 30 minutes to 1 hour. The atmosphere during the heat treatment may be an air atmosphere, an oxide atmosphere, or an inert atmosphere such as a nitrogen or argon atmosphere.

By controlling the raw materials used, the mixing conditions of the raw material mixture, and the heat treatment conditions as described above, the lithium composite oxide according to the first embodiment can be substantially obtained.

The energy required for mixing the elements can be further decreased by using, for example, a lithium-transition metal composite oxide as a precursor. This provides the lithium composite oxide according to the first embodiment with a higher purity.

The composition of the obtained lithium composite oxide can be determined by, for example, ICP emission spectrometry, an inert gas fusion-infrared absorption method, ion chromatography, or a combination thereof.

The space group of the crystal structure of the obtained lithium composite oxide can be determined by powder X-ray analysis.

As described above, the method for producing a lithium composite oxide according to the first embodiment includes (a) a step of providing raw materials, (b) a step of mechanochemically reacting the raw materials to obtain a precursor of a lithium composite oxide, and (c) a step of heat-treating the precursor to obtain a lithium composite oxide.

The step (a) may include a step of preparing a raw material mixture by mixing the raw materials such that the molar ratio of Li to Me is 1.3 or more and 1.9 or less.

Herein, the step (a) may include a step of producing a lithium compound serving as a raw material by a publicly known method.

The step (a) may include a step of preparing a raw material mixture by mixing the raw materials such that the molar ratio of Li to Me is 1.3 or more and 1.7 or less.

The step (b) may include a step of mechanochemically reacting the raw materials using a ball mill.

As described above, the lithium composite oxide according to the first embodiment can be synthesized by mechanochemically reacting the precursor (e.g., LiF, $Li_2O$, transition metal oxide, and lithium-transition metal composite oxide) using a planetary ball mill.

When the precursor is reacted by a solid-phase method, a more stable compound having a structure in which Li and Me are ordered is obtained.

That is, for example, when the precursor is reacted by a solid-phase method, a lithium composite oxide that has a crystal structure which belongs to space group C2/m and that has a ratio $I_{(003)}/I_{(104)}$ of 0.05 or more and 0.90 or less in an X-ray diffraction pattern is not obtained.

Hereafter, an example of a method for treating a covering material contained in the positive electrode active material according to the first embodiment will be described.

Any treatment method for further adding the covering material according to the first embodiment to the obtained lithium composite oxide may be employed. Examples of the treatment method that may be employed include an atomic layer deposition method, a neutralization reaction, a silane coupling reaction, a sol-gel process, and use of a planetary ball mill.

The covering material according to the first embodiment is, for example, a metal oxide. The metal oxide may be treated by, for example, a neutralization reaction. For example, an acidic salt of metal oxide may be added to an alkaline aqueous solution containing the lithium composite oxide dissolved therein. This causes a neutralization reaction and thus a metal oxide coating film can be formed on the surface of the lithium composite oxide. Examples of the acidic salt of metal oxide include manganese nitrate, magnesium nitrate, aluminum sulfate, calcium nitrate, sodium nitrate, potassium nitrate, and titanium sulfate.

The method for treating a covering material may be, for example, an atomic layer deposition method. Thus, a coating film of the covering material can be formed on the surface of the lithium composite oxide. Examples of the covering material include alumina, titanium oxide, zirconium oxide, zinc oxide, and tantalum oxide.

The presence of the lithium composite oxide and covering material contained in the positive electrode active material according to the first embodiment (e.g., covering of the surface of the lithium composite oxide with the covering material) can be observed by, for example, X-ray photoelectron spectroscopy or use of a scanning electron microscope or a transmission electron microscope.

Second Embodiment

Hereafter, a second embodiment will be described. Note that the same description as in the first embodiment will be appropriately omitted to avoid redundancy.

A battery according to the second embodiment includes a positive electrode containing the positive electrode active material according to the first embodiment, a negative electrode, and an electrolyte.

This configuration can provide batteries having good cycle characteristics.

In the battery according to the second embodiment, the positive electrode may include a positive electrode active material layer. Herein, the positive electrode active material layer may contain the positive electrode active material according to the first embodiment as a main component (i.e., 50% or more relative to the entire positive electrode active material layer on a mass basis (50 mass % or more)).

This configuration can provide batteries having better cycle characteristics.

Alternatively, in the battery according to the second embodiment, the positive electrode active material layer may contain 70% or more (70 mass % or more) of the positive electrode active material according to the first embodiment relative to the entire positive electrode active material layer on a mass basis.

This configuration can provide batteries having better cycle characteristics.

Alternatively, in the battery according to the second embodiment, the positive electrode active material layer may contain 90% or more (90 mass % or more) of the positive electrode active material according to the first embodiment relative to the entire positive electrode active material layer on a mass basis.

This configuration can provide batteries having better cycle characteristics.

The battery according to the second embodiment can be used for, for example, lithium ion secondary batteries, nonaqueous electrolyte secondary batteries, and all-solid-state batteries.

That is, the negative electrode of the battery according to the second embodiment may contain, for example, a negative electrode active material capable of occluding and releasing lithium ions. Alternatively, the negative electrode may contain, for example, a material capable of dissolving and precipitating lithium metal as a negative electrode active material.

In the battery according to the second embodiment, the electrolyte may be, for example, a nonaqueous electrolyte (e.g., nonaqueous electrolytic solution).

In the battery according to the second embodiment, the electrolyte may be, for example, a solid electrolyte.

FIG. 1 is a sectional view illustrating a schematic structure of a battery 10 that is an example of the battery according to the second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with, for example, a nonaqueous electrolyte (e.g., nonaqueous electrolytic solution).

The positive electrode 21, the negative electrode 22, and the separator 14 constitute an electrode assembly.

The electrode assembly is accommodated in the case 11.

The case 11 is sealed using the gasket 18 and the sealing plate 15.

The positive electrode 21 includes a positive electrode current collector 12 and a positive electrode active material layer 13 disposed on the positive electrode current collector 12.

The positive electrode current collector 12 is made of, for example, a metal material (e.g., aluminum, stainless steel, or aluminum alloy).

The positive electrode current collector 12 may be omitted, and the case 11 may be used as a positive electrode current collector.

The positive electrode active material layer 13 contains the positive electrode active material according to the first embodiment.

The positive electrode active material layer 13 may optionally contain, for example, additives (e.g., a conductive agent, an ion conductive auxiliary agent, and a binding agent).

The negative electrode 22 includes a negative electrode current collector 16 and a negative electrode active material layer 17 disposed on the negative electrode current collector 16.

The negative electrode current collector 16 is made of, for example, a metal material (e.g., aluminum, stainless steel, or aluminum alloy).

The negative electrode current collector 16 may be omitted, and the sealing plate 15 may be used as a negative electrode current collector.

The negative electrode active material layer 17 contains a negative electrode active material.

The negative electrode active material layer 17 may optionally contain, for example, additives (a conductive agent, an ion conductive auxiliary agent, and a binding agent).

Examples of the negative electrode active material include metal materials, carbon materials, oxides, nitrides, tin compounds, and silicon compounds.

The metal material may be a single metal or an alloy. Examples of the metal material include lithium metal and lithium alloys.

Examples of the carbon material include natural graphite, coke, partially graphitized carbon, carbon fiber, spherical carbon, artificial graphite, and amorphous carbon.

From the viewpoint of capacity density, the negative electrode active material may be silicon (Si), tin (Sn), a silicon compound, or a tin compound. The silicon compound and the tin compound may each be an alloy or a solid solution.

An example of the silicon compound is $SiO_x$ ($0.05<x<1.95$). A compound (alloy or solid solution) obtained by partly substituting a silicon atom of $SiO_x$ with another element may also be used. The other element is at least one element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ ($0<x<2$), $SnO_2$, and $SnSiO_3$. One tin compound selected from the foregoing may be used alone. Alternatively, two or more tin compounds selected from the foregoing may be used in combination.

The negative electrode active material may have any form. A negative electrode active material having a publicly known form (e.g., particulate form or fibrous form) can be used.

Lithium may be supplied (occluded) to the negative electrode active material layer 17 by any method. Specifically, the method is a method (a) in which lithium is deposited onto the negative electrode active material layer 17 by a gas phase method such as a vacuum deposition method or a method (b) in which a lithium metal foil and the negative electrode active material layer 17 are heated while being in contact with each other. By any of the methods, lithium can be diffused into the negative electrode active material layer 17 using heat. Alternatively, lithium may be electrochemically occluded into the negative electrode active material layer 17. Specifically, a battery is assembled using a negative electrode 22 not containing lithium and a lithium metal foil (positive electrode). Then, the battery is charged so that lithium is occluded into the negative electrode 22.

Examples of the binding agent for the positive electrode 21 and the negative electrode 22 include polyvinylidene fluoride, polytetrafluoroethylene, polyethylene, polypropylene, aramid resin, polyimide, polyimide, polyimide-imide, polyacrylonitrile, polyacrylic acid, poly(methyl acrylate), poly(ethyl acrylate), poly(hexyl acrylate), polymethacrylic acid, poly(methyl methacrylate), poly(ethyl methacrylate), poly(hexyl methacrylate), polyvinyl acetate, polyvinylpyrrolidone, polyether, polyether sulfone, hexafluoropolypropylene, styrene-butadiene rubber, and carboxymethyl cellulose. Alternatively, the binding agent may be a copolymer of two or more materials selected from the group consisting of tetrafluoroethylene, hexafluoroethane, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene. The binding agent may be a mixture of two or more materials selected from the foregoing materials.

Examples of the conductive agent for the positive electrode 21 and the negative electrode 22 include graphite, carbon black, conductive fibers, graphite fluoride, metal powder, conductive whiskers, conductive metal oxides, and organic conductive materials. Examples of the graphite include natural graphite and artificial graphite. Examples of the carbon black include acetylene black, Ketjenblack (registered trademark), channel black, furnace black, lamp black, and thermal black. An example of the metal powder is an aluminum powder. Examples of the conductive whiskers include zinc oxide whiskers and potassium titanate whiskers. An example of the conductive metal oxides is titanium oxide. An example of the organic conductive materials is a phenylene derivative.

The surface of the binding agent may be covered with a material used as the conductive agent. For example, the surface of the binding agent may be covered with carbon black. This increases the capacity of the battery.

The separator 14 may be made of a material having high ion permeability and sufficient mechanical strength. Examples of the material include microporous thin films, woven fabric, and nonwoven fabric. Specifically, the separator 14 is desirably made of a polyolefin such as polypropylene or polyethylene. The separator 14 made of a polyolefin has not only high durability, but also a shutdown function exhibited when excessively heated. The separator 14 has a thickness of, for example, 10 to 300 µm (or 10 to 40 µm). The separator 14 may be a single-layer film made of one material. Alternatively, the separator 14 may be a composite film (multilayer film) made of two or more materials. The separator 14 has a porosity of, for example, 30% to 70% (or 35% to 60%). The term "porosity" refers to a proportion of the volume of pores to the total volume of the separator 14. The "porosity" is measured by, for example, mercury intrusion.

The nonaqueous electrolytic solution contains a nonaqueous solvent and a lithium salt dissolved in the nonaqueous solvent.

Examples of the nonaqueous solvent include cyclic carbonate solvents, linear carbonate solvents, cyclic ether solvents, linear ether solvents, cyclic ester solvents, linear ester solvents, and fluorinated solvents.

Examples of the cyclic carbonate solvents include ethylene carbonate, propylene carbonate, and butylene carbonate.

Examples of the linear carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the linear ether solvents include 1,2-dimethoxyethane and 1,2-diethoxyethane.

An example of the cyclic ester solvents is γ-butyrolactone.

An example of the linear ester solvents is methyl acetate.

Examples of the fluorinated solvents include fluoroethylene carbonate, methyl fluoropropionate, fluorobenzene, fluoroethyl methyl carbonate, and fluorodimethylene carbonate.

One nonaqueous solvent selected from the foregoing solvents may be used alone. Alternatively, two or more nonaqueous solvents selected from the foregoing solvents may be used in combination.

The nonaqueous electrolytic solution may contain at least one fluorinated solvent selected from the group consisting of fluoroethylene carbonate, methyl fluoropropionate, fluorobenzene, fluoroethyl methyl carbonate, and fluorodimethylene carbonate.

When these fluorinated solvents are contained in the nonaqueous electrolytic solution, the oxidation resistance of the nonaqueous electrolytic solution is improved.

As a result, even when the battery 10 is charged at high voltage, the battery 10 can be stably operated.

In the battery according to the second embodiment, the electrolyte may be a solid electrolyte.

Examples of the solid electrolyte include organic polymer solid electrolytes, oxide solid electrolytes, and sulfide solid electrolytes.

An example of the organic polymer solid electrolytes is a compound of a polymer compound and a lithium salt.

The polymer compound may have an ethylene oxide structure. In this case, a large amount of the lithium salt can be contained, which further improves the ionic conductivity.

Examples of the oxide solid electrolytes include NASICON solid electrolytes such as $LiTi_2(PO_4)_3$ and its element-substituted derivatives; (LaLi)$TiO_3$-based perovskite solid electrolytes; LISICON solid electrolytes such as $Li_{14}ZnGe_4O_{16}$, $Li_4SiO_4$, $LiGeO_4$, and their element-substituted derivatives; garnet solid electrolytes such as $Li_7La_3Zr_2O_{12}$ and its element-substituted derivatives; $Li_3N$ and its H-substituted derivatives; and $Li_3PO_4$ and its N-substituted derivatives.

Examples of the sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Furthermore, LiX (X: F, Cl, Br, or I), $MO_y$, $Li_xMO_y$ (M: P, Si, Ge, B, Al, Ga, or In) (x and y: natural number), or the like may be added to the foregoing sulfide solid electrolytes.

In particular, among these solid electrolytes, sulfide solid electrolytes have excellent formability and high ionic conductivity. Therefore, the use of the sulfide solid electrolytes can provide batteries having a higher energy density.

Among the sulfide solid electrolytes, $Li_2S$—$P_2S_5$ has high electrochemical stability and higher ionic conductivity. Therefore, the use of $Li_2S$—$P_2S_5$ as a solid electrolyte can provide batteries having a higher energy density.

A solid electrolyte layer may contain the above-described nonaqueous electrolytic solution.

When a solid electrolyte layer contains the nonaqueous electrolytic solution, lithium ion transfer is facilitated between the active material and the solid electrolyte. This can provide batteries having a higher energy density.

The solid electrolyte layer may contain, for example, a gel electrolyte and an ionic liquid in addition to the solid electrolyte.

The gel electrolyte may be a polymer material containing a nonaqueous electrolytic solution. Examples of the polymer material include polyethylene oxide, polyacrylonitrile, polyvinylidene fluoride, poly(methyl methacrylate), and polymers having an ethylene oxide bond.

Examples of cations for the ionic liquid include chain aliphatic quaternary salts such as tetraalkylammoniums and tetraalkylphosphoniums; alicyclic ammoniums such as pyrrolidiniums, morpholiniums, imidazoliniums, tetrahydropyrimidiniums, piperaziniums, and piperidiniums; and nitrogen-containing heterocyclic aromatic cations such as pyridiniums and imidazoliums. Examples of anions for the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from the foregoing lithium salts may be used alone. Alternatively, two or more lithium salts selected from the foregoing lithium salts may be used as a mixture. The concentration of the lithium salt is, for example, in the range of 0.5 to 2 mol/L.

The battery according to the second embodiment may have various forms. For example, coin batteries, cylinder batteries, prismatic batteries, sheet batteries, button batteries, flat batteries, and stack batteries may be employed.

EXAMPLES

Example 1

Production of Positive Electrode Active Material

LiF, $Li_2MnO_3$, $LiMnO_2$, $LiCoO_2$, and $LiNiO_2$ were weighed so as to have a molar ratio of Li/Mn/Co/Ni/O/F=1.2/0.54/0.13/0.13/1.9/0.1.

The weighed raw materials were inserted into a 45 cc zirconia container together with an appropriate amount of φ3 mm zirconia balls, and the container was hermetically sealed in an argon glove box.

The raw materials were then taken out of the argon glove box and treated with a planetary ball mill at 600 rpm for 30 hours to obtain a precursor.

The obtained precursor was subjected to powder X-ray diffractometry.

The space group of the obtained precursor was Fm-3m.

The obtained precursor was then heat-treated in an air atmosphere at 700° C. for 1 hour to obtain a lithium composite oxide.

Then, the obtained lithium composite oxide was added to an aqueous manganese nitrate hexahydrate solution and stirred at 80° C. for 1 hour.

The amount of the manganese nitrate hexahydrate used was adjusted such that the mass ratio of $MnO_2$ to the lithium composite oxide was 0.05.

The aqueous solution after stirring was vacuum-dried and then heat-treated in an air atmosphere at 350° C. for 2 hours.

The produced positive electrode active material was subjected to powder X-ray diffractometry.

Figure 2:
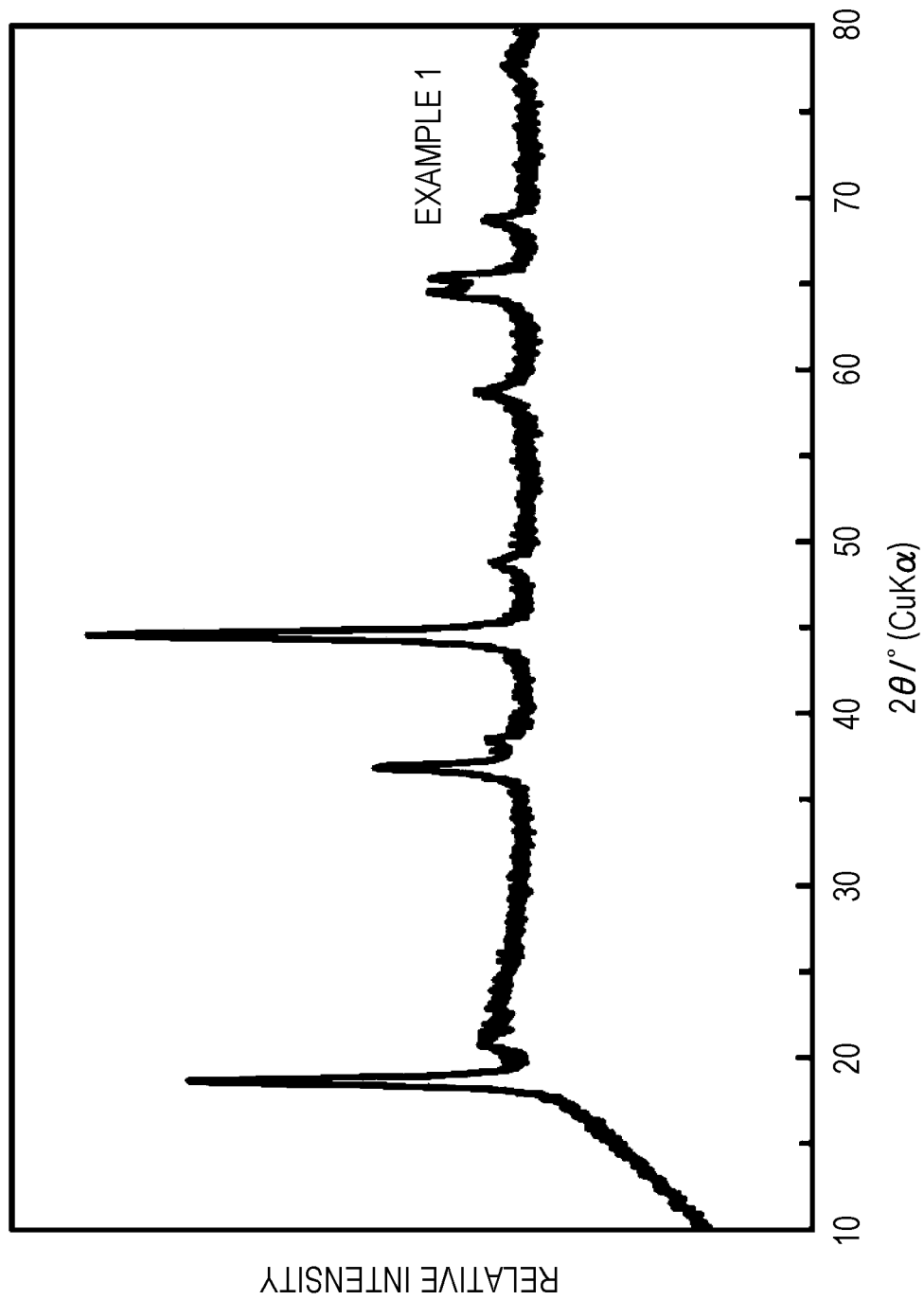
FIG. 2 illustrates an XRD pattern of a positive electrode active material in Example 1.

FIG. 2 illustrates the measurement results.

The space group of the obtained lithium composite oxide was found to be C2/m.

The integrated intensity ratio $I_{(003)}/I_{(104)}$ of a peak of a (003) plane to a peak of a (104) plane of the obtained lithium composite oxide was found to be 0.84.

As a result of the observation of the produced positive electrode active material through X-ray photoelectron spectroscopy, it was confirmed that $MnO_2$ was present on the surface of the lithium composite oxide represented by $Li_{1.2}Mn_{0.54}Co_{0.13}Ni_{0.13}O_{1.9}F_{0.1}$.

Production of Battery

Subsequently, 70 parts by mass of the positive electrode active material, 20 parts by mass of a conductive agent, 10 parts by mass of polyvinylidene fluoride (PVDF), and an appropriate amount of 2-methylpyrrolidone (NMP) were mixed with each other. Thus, a positive electrode mixture slurry was prepared.

The positive electrode mixture slurry was applied onto one surface of a positive electrode current collector having a thickness of 20 μm and formed of an aluminum foil.

The positive electrode mixture slurry was dried and rolling was performed to obtain a positive electrode plate including a positive electrode active material layer and having a thickness of 60 μm.

The obtained positive electrode plate was stamped into a circular shape with a diameter of 12.5 mm to obtain a positive electrode.

Furthermore, a lithium metal foil having a thickness of 300 μm was stamped into a circular shape with a diameter of 14.0 mm to obtain a negative electrode.

Fluoroethylene carbonate (FEC), ethylene carbonate (EC), and ethyl methyl carbonate (EMC) were mixed at a volume ratio of 1:1:6 to obtain a nonaqueous solvent.

$LiPF_6$ was dissolved in the nonaqueous solvent in a concentration of 1.0 mol/L to obtain a nonaqueous electrolytic solution.

A separator (manufactured by Celgard, LLC., product number: 2320, thickness: 25 μm) was impregnated with the obtained nonaqueous electrolytic solution. The separator is a three-layer separator including a polypropylene layer, a polyethylene layer, and a polypropylene layer.

The positive electrode, the negative electrode, and the separator were assembled in a dry box in which the dew point was controlled to −50° C., and thus a CR2032 coin battery was produced.

Examples 2 to 5

The covering material added was changed from that in Example 1.

Table 1 shows the composition of each of covering materials used in Examples 2 to 5. $Al_2O_3$ was used in Example 2, MgO was used in Example 3, $LiNbO_3$ was used in Example 4, and $LiBO_2$ was used in Example 5.

For example, in Example 4, a Li foil was dissolved in super-dehydrated ethanol in an Ar atmosphere, and niobium ethoxide was added dropwise thereto to prepare an aqueous solution to be used.

Except for this, positive electrode active materials in Examples 2 to 5 were synthesized in the same manner as in Example 1.

Furthermore, coin batteries in Examples 2 to 5 were produced in the same manner as in Example 1 using the positive electrode active materials in Examples 2 to 5.

Examples 6 to 8

The composition of the lithium composite oxide was changed from that in Example 1.

Table 1 shows the composition of each of lithium composite oxides used in Examples 6 to 8. $Li_{1.2}Mn_{0.8}O_{1.9}F_{0.1}$ was used in Example 6, $Li_{1.2}Mn_{0.6}Co_{0.2}O_{1.9}F_{0.1}$ was used in Example 7, and $Li_{1.2}Mn_{0.6}Ni_{0.2}O_{1.9}F_{0.1}$ was used in Example 8.

Except for this, positive electrode active materials in Examples 6 to 8 were synthesized in the same manner as in Example 1.

Furthermore, coin batteries in Examples 6 to 8 were produced in the same manner as in Example 1 using the positive electrode active materials in Examples 6 to 8.

Comparative Examples 1 to 4

Lithium composite oxides in Comparative Examples 1 to 4 were obtained in the same manner as in Examples 1 to 8.

Table 1 shows the composition of each of the lithium composite oxides in Comparative Examples 1 to 4.

Herein, the covering material was not added.

Except for this, positive electrode active materials in Comparative Examples 1 to 4 were synthesized in the same manner as in Example 1.

Coin batteries in Comparative Examples 1 to 4 were produced in the same manner as in Example 1 using the produced positive electrode active materials.

Evaluation of Battery

The current density at the positive electrode was set to 0.5 $mA/cm^2$ and the batteries in Examples 1 to 8 and Comparative Examples 1 to 4 were charged until the voltage reached 4.7 V.

Subsequently, the end-of-discharge voltage was set to 2.5 V and the batteries in Examples 1 to 8 and Comparative Examples 1 to 4 were discharged at a current density of 0.5 $mA/cm^2$.

Furthermore, 20 cycles of the charge-discharge test were repeatedly performed to measure the capacity retention of each of the batteries in Examples 1 to 8 and Comparative Examples 1 to 4.

Figure 3:
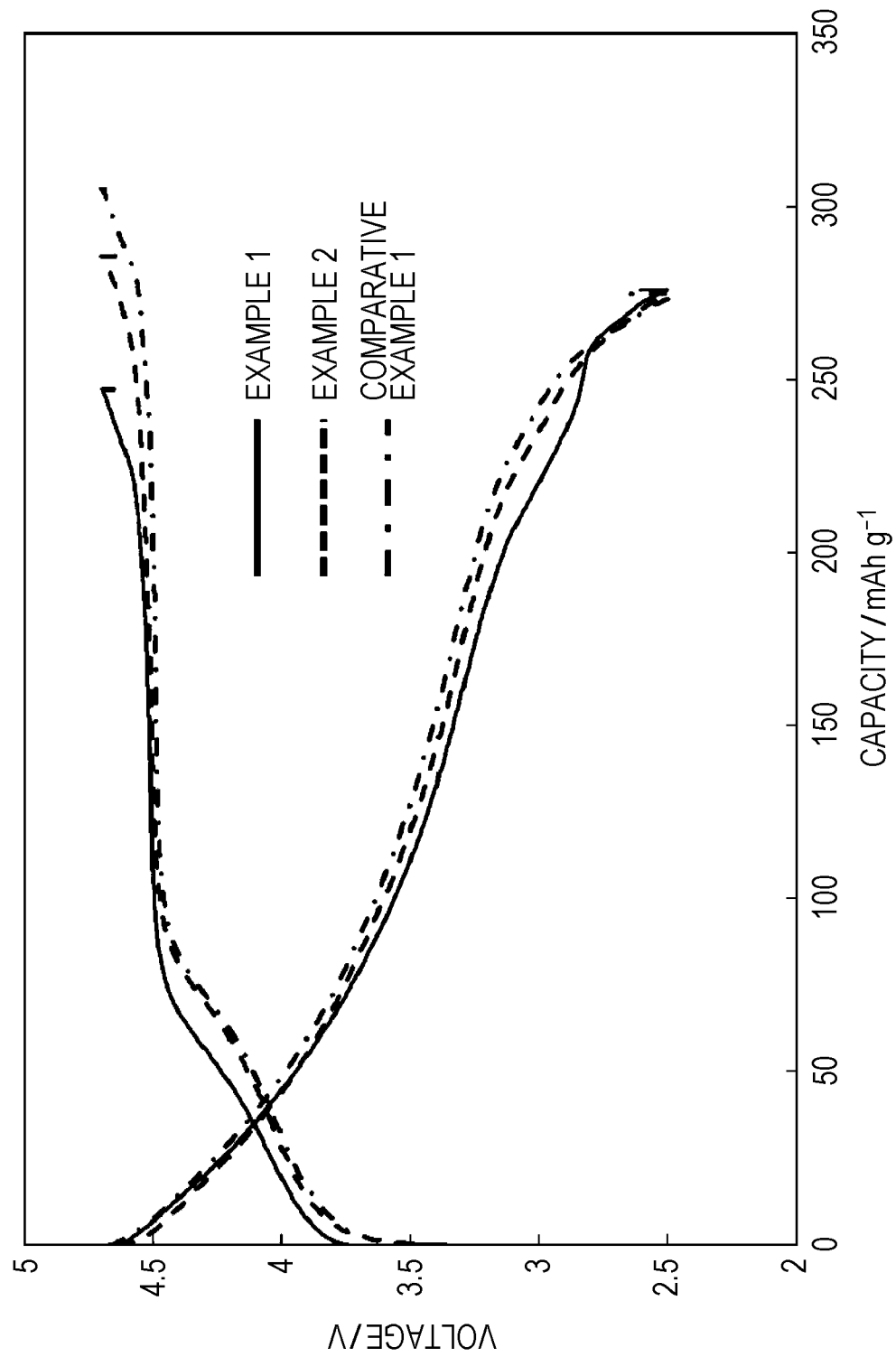
FIG. 3 illustrates the results of an initial charge-discharge test of batteries in Examples 1 and 2 and Comparative Example 1.

FIG. 3 illustrates the results of the initial charge-discharge test of the batteries in Examples 1 and 2 and Comparative Example 1.

Figure 4:
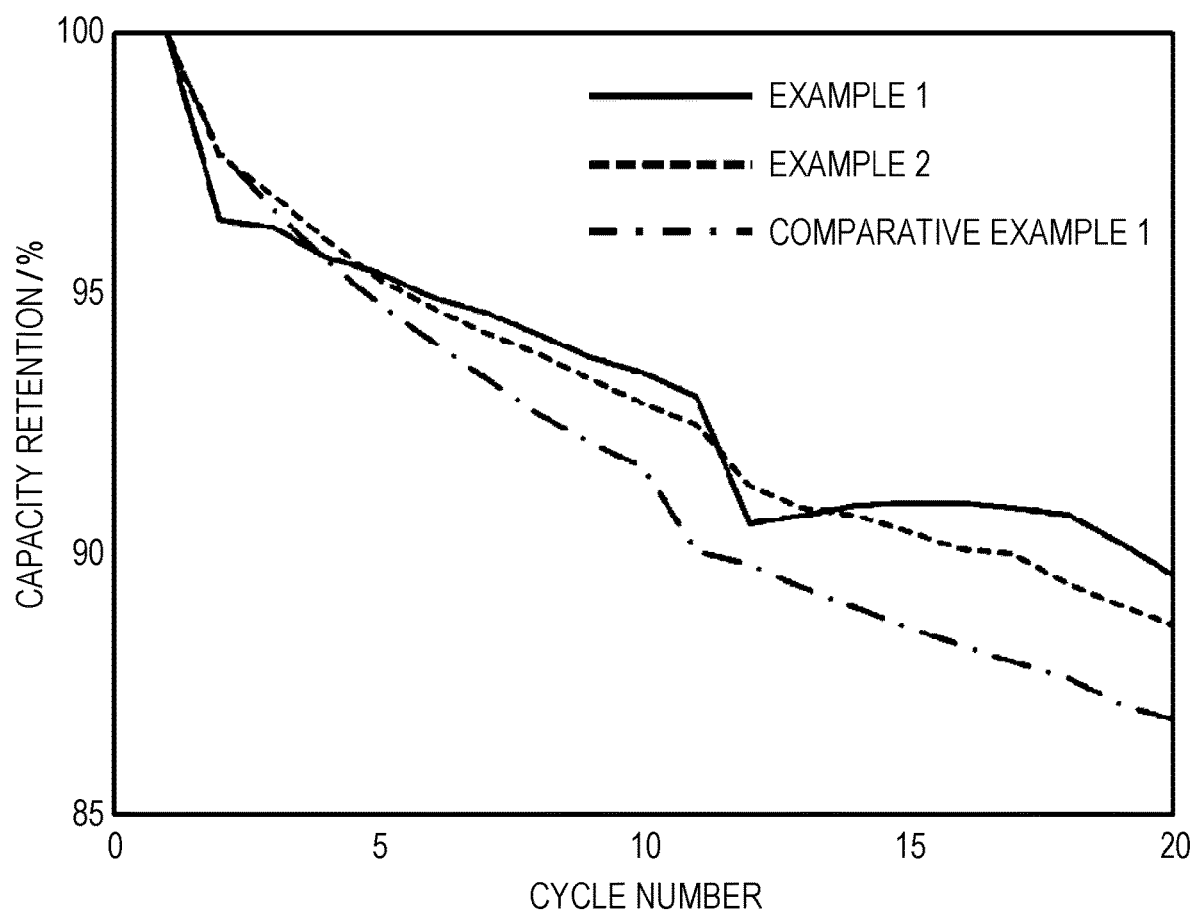
FIG. 4 illustrates the results of a charge-discharge cycle test of batteries in Examples 1 and 2 and Comparative Example 1.

FIG. 4 illustrates the results of the charge-discharge cycle test of the batteries in Examples 1 and 2 and Comparative Example 1.

The initial discharge capacity of the battery in Example 1 was 276 mAh/g. The initial discharge capacity of the battery in Example 2 was 275 mAh/g. On the other hand, the initial discharge capacity of the battery in Comparative Example 1 was 274 mAh/g.

The capacity retention after 20 cycles of the battery in Example 1 was 90%. The capacity retention after 20 cycles of the battery in Example 2 was 89%. On the other hand, the capacity retention after 20 cycles of the battery in Comparative Example 1 was 86%.

Table 1 shows the results.

TABLE 1

| | Lithium composite oxide | | | Covering material | | Initial discharge capacity (mAh/g) | Capacity retention (%) |
|---|---|---|---|---|---|---|---|
| | Composition | Space group | $I_{(003)}/I_{(104)}$ | Composition | Mass ratio | | |
| Example 1 | $Li_{1.2}Mn_{0.54}Co_{0.13}Ni_{0.13}O_{1.9}F_{0.1}$ | C2/m | 0.84 | $MnO_2$ | 0.05 | 276 | 90 |
| Example 2 | $Li_{1.2}Mn_{0.54}Co_{0.13}Ni_{0.13}O_{1.9}F_{0.1}$ | C2/m | 0.89 | $Al_2O_3$ | 0.05 | 275 | 89 |
| Example 3 | $Li_{1.2}Mn_{0.54}Co_{0.13}Ni_{0.13}O_{1.9}F_{0.1}$ | C2/m | 0.88 | MgO | 0.05 | 275 | 89 |
| Example 4 | $Li_{1.2}Mn_{0.54}Co_{0.13}Ni_{0.13}O_{1.9}F_{0.1}$ | C2/m | 0.83 | $LiNbO_3$ | 0.05 | 265 | 88 |
| Example 5 | $Li_{1.2}Mn_{0.54}Co_{0.13}Ni_{0.13}O_{1.9}F_{0.1}$ | C2/m | 0.83 | $LiBO_2$ | 0.05 | 268 | 87 |
| Example 6 | $Li_{1.2}Mn_{0.8}O_{1.9}F_{0.1}$ | C2/m | 0.70 | $MnO_2$ | 0.05 | 282 | 85 |
| Example 7 | $Li_{1.2}Mn_{0.6}Co_{0.2}O_{1.9}F_{0.1}$ | C2/m | 0.55 | $MnO_2$ | 0.05 | 278 | 83 |
| Example 8 | $Li_{1.2}Mn_{0.6}Ni_{0.2}O_{1.9}F_{0.1}$ | C2/m | 0.73 | $MnO_2$ | 0.05 | 276 | 85 |
| Comparative Example 1 | $Li_{1.2}Mn_{0.54}Co_{0.13}Ni_{0.13}O_{1.9}F_{0.1}$ | C2/m | 0.81 | — | — | 274 | 86 |
| Comparative Example 2 | $Li_{1.2}Mn_{0.8}O_{1.9}F_{0.1}$ | C2/m | 0.65 | — | — | 281 | 80 |
| Comparative Example 3 | $Li_{1.2}Mn_{0.6}Co_{0.2}O_{1.9}F_{0.1}$ | C2/m | 0.44 | — | — | 276 | 82 |
| Comparative Example 4 | $Li_{1.2}Mn_{0.6}Ni_{0.2}O_{1.9}F_{0.1}$ | C2/m | 0.69 | — | — | 274 | 84 |

As shown in Table 1, the initial discharge capacity of the batteries in Examples 1 to 3 is higher than the initial discharge capacity of the battery in Comparative Example 1.

The reason for this is believed to be as follows. The batteries in Examples 1 to 3 contain a covering material. That is, the direct contact between the surface of the lithium composite oxide and the electrolytic solution is suppressed by the covering material. This suppresses the elimination of oxygen that leads to a reduction in the capacity of the positive electrode active material, which ameliorates the irreversibility of the charge-discharge reaction. Thus, the initial discharge capacity is improved.

As shown in Table 1, the initial discharge capacity of the batteries in Examples 4 and 5 is lower than the initial discharge capacity of the battery in Comparative Example 1.

The reason for this is believed to be as follows. In the batteries in Examples 4 and 5, the covering material contains Li. Consequently, for example, when Li ions are intercalated and deintercalated during the initial charge and discharge, Li is partly trapped in the covering material. This slightly decreases the initial discharge capacity.

As shown in Table 1, the capacity retention after 20 cycles of the batteries in Examples 1 to 5 is higher than the capacity retention after 20 cycles of the battery in Comparative Example 1.

The reason for this is believed to be as follows. The batteries in Examples 1 to 5 contain a covering material. That is, the direct contact between the surface of the lithium composite oxide and the electrolytic solution is suppressed by the covering material. This suppresses, for example, the generation of gas due to a side reaction of the lithium composite oxide and the electrolytic solution, the elimination of oxygen, and the generation of a side reaction product onto the surface of the positive electrode active material. Thus, the capacity retention after 20 cycles is improved.

As shown in Table 1, the initial discharge capacity and capacity retention after 20 cycles of the battery in Example 1 are higher than those of the batteries in Examples 2 to 5.

The reason for this is believed to be as follows. In the battery in Example 1, the covering material contains a metal element (Mn) contained in the lithium composite oxide. That is, when the covering material and the lithium composite oxide contains the same element (Mn), a solid solution is formed at an interface between the covering material and the lithium composite oxide, which strengthens the bond. Thus, the elimination of Mn is suppressed and the initial discharge capacity and the capacity retention after 20 cycles are improved.

As shown in Table 1, the initial discharge capacity and capacity retention after 20 cycles of the battery in Example 6 are higher than those of the battery in Comparative Example 2.

As shown in Table 1, the initial discharge capacity and capacity retention after 20 cycles of the battery in Example 7 are higher than those of the battery in Comparative Example 3.

As shown in Table 1, the initial discharge capacity and capacity retention after 20 cycles of the battery in Example 8 are higher than those of the battery in Comparative Example 4.

The reason for this is believed to be as follows. The batteries in Examples 6 to 8 contain a covering material. That is, even when any lithium composite oxide according to the present disclosure other than the lithium composite oxides having the chemical compositions in Examples 1 to 8 is used, the cycle characteristics are improved by adding a covering material.

Hereafter, Reference Examples will be described. The positive electrode active materials in Reference Examples below contain a lithium composite oxide but not the covering material according to the present disclosure.

Reference Example 1

LiF, $Li_2MnO_3$, $LiMnO_2$, $LiCoO_2$, and $LiNiO_2$ were weighed so as to have a molar ratio of Li/Mn/Co/Ni/O/F=1.2/0.54/0.13/0.13/1.9/0.1.

The weighed raw materials were inserted into a 45 cc zirconia container together with an appropriate amount of φ3 mm zirconia balls, and the container was hermetically sealed in an argon glove box.

The raw materials were then taken out of the argon glove box and treated with a planetary ball mill at 600 rpm for 30 hours to obtain a precursor.

The obtained precursor was subjected to powder X-ray diffractometry.

The space group of the obtained precursor was Fm-3m.

The obtained precursor was then heat-treated in an air atmosphere at 700° C. for 1 hour.

The produced positive electrode active material was subjected to powder X-ray diffractometry.

The space group of the produced positive electrode active material was C2/m.

The integrated intensity ratio $I_{(003)}/I_{(104)}$ of a peak of a (003) plane to a peak of a (104) plane of the produced positive electrode active material was 0.80.

A coin battery in Reference Example 1 was produced in the same manner as in Example 1 using the produced positive electrode active material.

Reference Examples 2 to 26

The precursor and the mixing ratio of Li/Me/O/F were changed from those in Reference Example 1.

Table 2 shows the composition of each of positive electrode active materials in Reference Examples 2 to 26.

Furthermore, the heat treatment conditions were changed within 600° C. to 900° C. and 30 minutes to 1 hour from those in Reference Example 1.

Except for this, positive electrode active materials in Reference Examples 2 to 26 were synthesized in the same manner as in Reference Example 1.

The space group of each of the positive electrode active materials in Reference Examples 2 to 26 was C2/m.

The precursors in Reference Examples 2 to 26 were weighed on a stoichiometric basis and mixed with each other in the same manner as in Reference Example 1.

For example, in Reference Example 13, LiF, $Li_2MnO_3$, $LiMnO_2$, $LiCoO_2$, $LiNiO_2$, and MgO were weighed so as to have a molar ratio of Li/Mn/Co/Ni/Mg/O/F=1.2/0.49/0.13/0.13/0.05/1.9/0.1 and mixed with each other.

Furthermore, coin batteries in Reference Examples 2 to 26 were produced in the same manner as in Reference Example 1 using the positive electrode active materials in Reference Examples 2 to 26.

Reference Example 27

A positive electrode active material having a composition represented by $Li_{1.2}Mn_{0.54}Co_{0.13}Ni_{0.13}O_{1.9}F_{0.1}$ was produced in the same manner as in Reference Example 1.

Herein, the heat treatment conditions were changed to 700° C. and 3 hours.

The produced positive electrode active material was subjected to powder X-ray diffractometry.

The space group of the produced positive electrode active material was C2/m.

The integrated intensity ratio $I_{(003)}/I_{(104)}$ of a peak of a (003) plane to a peak of a (104) plane of the produced positive electrode active material was 1.03.

A coin battery in Reference Example 27 was produced in the same manner as in Reference Example 1 using the produced positive electrode active material.

Reference Example 28

A positive electrode active material having a composition represented by $Li_{1.2}Mn_{0.54}Co_{0.13}Ni_{0.13}O_{1.9}F_{0.1}$ was produced in the same manner as in Reference Example 1.

Herein, the heat treatment conditions were changed to 300° C. and 10 minutes.

The produced positive electrode active material was subjected to powder X-ray diffractometry.

The space group of the produced positive electrode active material was C2/m.

The integrated intensity ratio $I_{(003)}/I_{(104)}$ of a peak of a (003) plane to a peak of a (104) plane of the produced positive electrode active material was 0.02.

A coin battery in Reference Example 28 was produced in the same manner as in Reference Example 1 using the produced positive electrode active material.

Reference Example 29

A positive electrode active material having a composition represented by $Li_{1.2}Mn_{0.54}Co_{0.13}Ni_{0.13}O_{2.0}$ was produced in the same manner as in Reference Example 1.

Herein, LiF was not used as a raw material.

The produced positive electrode active material was subjected to powder X-ray diffractometry.

The space group of the produced positive electrode active material was C2/m.

The integrated intensity ratio $I_{(003)}/I_{(104)}$ of a peak of a (003) plane to a peak of a (104) plane of the produced positive electrode active material was 0.82.

A coin battery in Reference Example 29 was produced in the same manner as in Reference Example 1 using the produced positive electrode active material.

Reference Example 30

A positive electrode active material having a composition represented by $Li_{1.2}Mn_{0.54}Co_{0.13}Ni_{0.13}O_{1.9}F_{0.1}$ was produced in the same manner as in Reference Example 1.

Herein, after the treatment with a ball mill, the heat treatment was not performed.

The produced positive electrode active material was subjected to powder X-ray diffractometry.

The space group of the produced positive electrode active material was Fm-3m.

A coin battery in Reference Example 30 was produced in the same manner as in Reference Example 1 using the produced positive electrode active material.

Reference Example 31

A positive electrode active material having a composition represented by $LiCoO_2$ was produced by a publicly known method.

The produced positive electrode active material was subjected to powder X-ray diffractometry.

The space group of the produced positive electrode active material was R-3m.

A coin battery in Reference Example 31 was produced in the same manner as in Reference Example 1 using the produced positive electrode active material.

Evaluation of Battery

The current density at the positive electrode was set to 0.5 mA/cm² and the battery in Reference Example 1 was charged until the voltage reached 4.9 V.

Subsequently, the end-of-discharge voltage was set to 2.5 V and the battery in Reference Example 1 was discharged at a current density of 0.5 mA/cm².

The initial discharge capacity of the battery in Reference Example 1 was 299 mAh/g.

Furthermore, the current density at the positive electrode was set to 0.5 mA/cm² and the battery in Reference Example 27 was charged until the voltage reached 4.3 V.

Subsequently, the end-of-discharge voltage was set to 2.5 V and the battery in Reference Example 27 was discharged at a current density of 0.5 mA/cm².

The initial discharge capacity of the battery in Reference Example 27 was 236 mAh/g.

Furthermore, the initial discharge capacity of each of the coin batteries in Reference Examples 2 to 26 and Reference Examples 28 to 31 was measured.

Table 2 shows the results.

TABLE 2

| | Composition | x/y | α/β | (x + y)/ (α + β) | Space group | $I_{(003)}/I_{(104)}$ | Initial discharge capacity (mAh/g) |
|---|---|---|---|---|---|---|---|
| Reference Example 1 | $Li_{1.2}Mn_{0.54}Co_{0.13}Ni_{0.13}O_{1.9}F_{0.1}$ | 1.5 | 19 | 1.0 | C2/m | 0.80 | 299 |
| Reference Example 2 | $Li_{1.2}Mn_{0.54}Co_{0.13}Ni_{0.13}O_{1.9}F_{0.1}$ | 1.5 | 19 | 1.0 | C2/m | 0.62 | 289 |
| Reference Example 3 | $Li_{1.2}Mn_{0.54}Co_{0.13}Ni_{0.13}O_{1.9}F_{0.1}$ | 1.5 | 19 | 1.0 | C2/m | 0.11 | 282 |
| Reference Example 4 | $Li_{1.2}Mn_{0.54}Co_{0.13}Ni_{0.13}O_{1.9}F_{0.1}$ | 1.5 | 19 | 1.0 | C2/m | 0.85 | 274 |
| Reference Example 5 | $Li_{1.2}Mn_{0.54}Co_{0.13}Ni_{0.13}O_{1.95}F_{0.05}$ | 1.5 | 39 | 1.0 | C2/m | 0.78 | 294 |
| Reference Example 6 | $Li_{1.2}Mn_{0.54}Co_{0.13}Ni_{0.13}O_{1.8}F_{0.2}$ | 1.5 | 9 | 1.0 | C2/m | 0.83 | 269 |
| Reference Example 7 | $Li_{1.2}Mn_{0.8}O_{1.9}F_{0.1}$ | 1.5 | 19 | 1.0 | C2/m | 0.65 | 281 |
| Reference Example 8 | $Li_{1.2}Mn_{0.6}Co_{0.2}O_{1.9}F_{0.1}$ | 1.5 | 19 | 1.0 | C2/m | 0.44 | 276 |
| Reference Example 9 | $Li_{1.2}Mn_{0.6}Ni_{0.2}O_{1.9}F_{0.1}$ | 1.5 | 19 | 1.0 | C2/m | 0.69 | 274 |
| Reference Example 10 | $Li_{1.25}Mn_{0.51}Co_{0.12}Ni_{0.12}O_{1.9}F_{0.1}$ | 1.7 | 19 | 1.0 | C2/m | 0.70 | 271 |
| Reference Example 11 | $Li_{1.3}Mn_{0.5}Co_{0.1}Ni_{0.1}O_{1.9}F_{0.1}$ | 1.9 | 19 | 1.0 | C2/m | 0.53 | 266 |
| Reference Example 12 | $Li_{1.15}Mn_{0.57}Co_{0.14}Ni_{0.14}O_{1.9}F_{0.1}$ | 1.3 | 19 | 1.0 | C2/m | 0.61 | 269 |
| Reference Example 13 | $Li_{1.2}Mn_{0.49}Co_{0.13}Ni_{0.13}Mg_{0.05}O_{1.9}F_{0.1}$ | 1.5 | 19 | 1.0 | C2/m | 0.79 | 295 |
| Reference Example 14 | $Li_{1.2}Mn_{0.49}Co_{0.13}Ni_{0.13}B_{0.05}O_{1.9}F_{0.1}$ | 1.5 | 19 | 1.0 | C2/m | 0.77 | 298 |
| Reference Example 15 | $Li_{1.2}Mn_{0.49}Co_{0.13}Ni_{0.13}P_{0.05}O_{1.9}F_{0.1}$ | 1.5 | 19 | 1.0 | C2/m | 0.79 | 292 |
| Reference Example 16 | $Li_{1.2}Mn_{0.49}Co_{0.13}Ni_{0.13}Al_{0.05}O_{1.9}F_{0.1}$ | 1.5 | 19 | 1.0 | C2/m | 0.80 | 290 |

TABLE 2-continued

| | Composition | x/y | α/β | (x + y)/ (α + β) | Space group | $I_{(003)}/I_{(104)}$ | Initial discharge capacity (mAh/g) |
|---|---|---|---|---|---|---|---|
| Reference Example 17 | $Li_{1.2}Mn_{0.49}Co_{0.13}Ni_{0.13}Ti_{0.05}O_{1.9}F_{0.1}$ | 1.5 | 19 | 1.0 | C2/m | 0.80 | 285 |
| Reference Example 18 | $Li_{1.2}Mn_{0.49}Co_{0.13}Ni_{0.13}Nb_{0.05}O_{1.9}F_{0.1}$ | 1.5 | 19 | 1.0 | C2/m | 0.76 | 283 |
| Reference Example 19 | $Li_{1.2}Mn_{0.49}Co_{0.13}Ni_{0.13}W_{0.05}O_{1.9}F_{0.1}$ | 1.5 | 19 | 1.0 | C2/m | 0.74 | 283 |
| Reference Example 20 | $Li_{1.2}Mn_{0.49}Co_{0.13}Ni_{0.13}V_{0.05}O_{1.9}F_{0.1}$ | 1.5 | 19 | 1.0 | C2/m | 0.81 | 291 |
| Reference Example 21 | $Li_{1.2}Mn_{0.49}Co_{0.13}Ni_{0.13}Cr_{0.05}O_{1.9}F_{0.1}$ | 1.5 | 19 | 1.0 | C2/m | 0.80 | 294 |
| Reference Example 22 | $Li_{1.2}Mn_{0.49}Co_{0.13}Ni_{0.13}Si_{0.05}O_{1.9}F_{0.1}$ | 1.5 | 19 | 1.0 | C2/m | 0.82 | 286 |
| Reference Example 23 | $Li_{1.2}Mn_{0.49}Co_{0.13}Ni_{0.13}Fe_{0.05}O_{1.9}F_{0.1}$ | 1.5 | 19 | 1.0 | C2/m | 0.75 | 285 |
| Reference Example 24 | $Li_{1.2}Mn_{0.49}Co_{0.13}Ni_{0.13}Cu_{0.05}O_{1.9}F_{0.1}$ | 1.5 | 19 | 1.0 | C2/m | 0.77 | 288 |
| Reference Example 25 | $Li_{1.2}Mn_{0.49}Co_{0.13}Ni_{0.13}Ru_{0.05}O_{1.9}F_{0.1}$ | 1.5 | 19 | 1.0 | C2/m | 0.76 | 285 |
| Reference Example 26 | $Li_{1.2}Mn_{0.49}Co_{0.13}Ni_{0.13}Na_{0.05}O_{1.9}F_{0.1}$ | 1.5 | 19 | 1.0 | C2/m | 0.77 | 285 |
| Reference Example 27 | $Li_{1.2}Mn_{0.54}Co_{0.13}Ni_{0.13}O_{1.9}F_{0.1}$ | 1.5 | 19 | 1.0 | C2/m | 1.03 | 236 |
| Reference Example 28 | $Li_{1.2}Mn_{0.54}Co_{0.13}Ni_{0.13}O_{1.9}F_{0.1}$ | 1.5 | 19 | 1.0 | C2/m | 0.02 | 256 |
| Reference Example 29 | $Li_{1.2}Mn_{0.54}Co_{0.13}Ni_{0.13}O_{2}$ | 1.5 | — | 1.0 | C2/m | 0.82 | 249 |
| Reference Example 30 | $Li_{1.2}Mn_{0.54}Co_{0.13}Ni_{0.13}O_{1.9}F_{0.1}$ | 1.5 | 19 | 1.0 | Fm-3m | — | 253 |
| Reference Example 31 | $LiCoO_2$ | 1.0 | — | 1.0 | R-3m | — | 150 |

As shown in Table 2, the batteries in Reference Examples 1 to 26 have an initial discharge capacity of 266 to 299 mAh/g.

That is, the initial discharge capacity of the batteries in Reference Examples 1 to 26 is higher than the initial discharge capacity of the batteries in Reference Examples 27 to 31.

The reason for this is believed to be as follows. In the batteries in Reference Examples 1 to 26, the positive electrode active material contains a lithium composite oxide which contains F and has a crystal structure that belongs to space group C2/m and in which the integrated intensity ratio $I_{(003)}/I_{(104)}$ of a peak of a (003) plane to a peak of a (104) plane in an XRD pattern satisfies $0.05 \leq I_{(003)}/I_{(104)} \leq 0.90$. That is, the crystal structure is stabilized by partly replacing oxygen with F, which has a high electronegativity. Furthermore, when $0.05 \leq I_{(003)}/I_{(104)} \leq 0.90$ is satisfied, Li and Me are sufficiently subjected to cation mixing, which increases the number of adjacent Li atoms and improves the diffusibility of Li. By combining these effects, the initial discharge capacity is considerably improved.

In Reference Example 27, the ratio $I_{(003)}/I_{(104)}$ is larger than 0.90 ($I_{(003)}/I_{(104)}=1.03$). Therefore, it is believed that the cation mixing is suppressed, which reduces the number of three-dimensional diffusion paths of lithium. This inhibits the diffusion of lithium and decreases the initial discharge capacity.

In Reference Example 28, the ratio $I_{(003)}/I_{(104)}$ is smaller than 0.05 ($I_{(003)}/I_{(104)}=0.02$). Therefore, it is believed that the crystal structure becomes thermodynamically unstable and is broken when the deintercalation of Li during charge proceeds. Thus, the initial discharge capacity is believed to be decreased.

In Reference Example 29, the lithium composite oxide does not contain F. Therefore, it is believed that the crystal structure becomes unstable and is broken when the deintercalation of Li during charge proceeds. Thus, the initial discharge capacity is believed to be decreased.

As shown in Table 2, the initial discharge capacity of the battery in Reference Example 2 is lower than the initial discharge capacity of the battery in Reference Example 1.

The reason for this is believed to be as follows. The ratio $I_{(003)}/I_{(104)}$ is smaller in Reference Example 2 ($I_{(003)}/I_{(104)}=0.62$) than in Reference Example 1. Therefore, the crystal structure becomes unstable and the initial discharge capacity is decreased.

As shown in Table 2, the initial discharge capacity of the battery in Reference Example 3 is lower than the initial discharge capacity of the battery in Reference Example 2.

The reason for this is believed to be as follows. The ratio $I_{(003)}/I_{(104)}$ is smaller in Reference Example 3 ($I_{(003)}/I_{(104)}=0.11$) than in Reference Example 2. Therefore, the crystal structure becomes unstable and the initial discharge capacity is decreased.

As shown in Table 2, the initial discharge capacity of the battery in Reference Example 4 is lower than the initial discharge capacity of the battery in Reference Example 1.

The reason for this is believed to be as follows. The ratio $I_{(003)}/I_{(104)}$ is larger in Reference Example 4 ($I_{(003)}/I_{(104)}=0.85$) than in Reference Example 1. Therefore, the cation mixing is suppressed, which slightly reduces the number of three-dimensional diffusion paths of lithium. Thus, the initial discharge capacity is decreased.

As shown in Table 2, the initial discharge capacity of the battery in Reference Example 5 is lower than the initial discharge capacity of the battery in Reference Example 1.

The reason for this is believed to be as follows. The ratio α/β is larger in Reference Example 5 (α/β=39) than in Reference Example 1. That is, as a result of an excessive increase in the capacity due to the oxidation-reduction reaction of oxygen and a reduction in the influence of F, which has a high electronegativity, the structure becomes unstable when Li is deintercalated. Thus, the initial discharge capacity is decreased.

As shown in Table 2, the initial discharge capacity of the battery in Reference Example 6 is lower than the initial discharge capacity of the battery in Reference Example 1.

The reason for this is believed to be as follows. The ratio α/β is smaller in Reference Example 6 (α/β=9) than in Reference Example 1. That is, as a result of a decrease in the amount of charge compensation due to the oxidation-reduction reaction of oxygen and an increase in the influence of F, which has a high electronegativity, the electron conductivity is decreased. Thus, the initial discharge capacity is decreased.

As shown in Table 2, the initial discharge capacity of the batteries in Reference Examples 7 to 9 is lower than the initial discharge capacity of the battery in Reference Example 1.

The reason for this is believed to be as follows. In Reference Examples 7 to 9, Co that produces an effect of stabilizing the structure and/or Ni that produces an effect of facilitating the deintercalation of Li is not contained unlike in Reference Example 1. Thus, the initial discharge capacity is decreased.

As shown in Table 2, the initial discharge capacity of the battery in Reference Example 10 is lower than the initial discharge capacity of the battery in Reference Example 1.

The reason for this is believed to be as follows. The ratio x/y is larger in Reference Example 10 (x/y=1.7) than in Reference Example 1. Therefore, a large amount of Li in the crystal structure is extracted during the initial charge of the battery, which destabilizes the crystal structure. This decreases the amount of Li intercalated during discharge. Thus, the initial discharge capacity is decreased.

As shown in Table 2, the initial discharge capacity of the battery in Reference Example 11 is lower than the initial discharge capacity of the battery in Reference Example 10.

The reason for this is believed to be as follows. The ratio x/y is larger in Reference Example 11 (x/y=1.9) than in Reference Example 10. Therefore, a large amount of Li in the crystal structure is extracted during the initial charge of the battery, which destabilizes the crystal structure. This decreases the amount of Li intercalated during discharge. Thus, the initial discharge capacity is decreased.

As shown in Table 2, the initial discharge capacity of the battery in Reference Example 12 is lower than the initial discharge capacity of the battery in Reference Example 1.

The reason for this is believed to be as follows. The ratio x/y is smaller in Reference Example 12 (x/y=1.3) than in Reference Example 1. Therefore, the amount of Li that contributes to the reaction is decreased, which degrades the diffusibility of Li ions. Thus, the initial discharge capacity is decreased.

As shown in Table 2, the initial discharge capacity of the batteries in Reference Examples 13 to 26 is lower than the initial discharge capacity of the battery in Reference Example 1.

The reason for this is believed to be as follows. In Reference Examples 13 to 26, the amount of Mn having orbitals easily hybridized with those of oxygen is decreased compared with in Reference Example 1. Thus, the contribution of oxygen to the oxidation-reduction reaction is slightly reduced and the initial discharge capacity is decreased.

What is claimed is:

1. A positive electrode active material comprising:
a lithium composite oxide containing at least one element selected from the group consisting of fluorine, chlorine, nitrogen, and sulfur; and
a covering material that covers a surface of the lithium composite oxide,
wherein the covering material has an electron conductivity of $10^6$ S/m or less,
the lithium composite oxide has a crystal structure that belongs to space group C2/m,
a ratio of a first integrated intensity of a first peak located at a diffraction angle 2θ in a range of 18 to 20 degrees to a second integrated intensity of a second peak located at a diffraction angle 2θ in a range of 44 to 46 degrees in an XRD pattern, obtained with CuKα radiation, of the lithium composite oxide satisfies 0.05 or more and 0.90 or less, and
the lithium composite oxide is represented by a formula $Li_xMe_yO_\alpha Q_\beta$,
where Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al; Q is at least one selected from the group consisting of F and Cl; and $1.15 \leq x \leq 1.3$, $0.7 \leq y \leq 0.85$, $1.8 \leq \alpha \leq 1.95$, and $0.05 \leq \beta \leq 0.2$.

2. The positive electrode active material according to claim 1,
wherein the covering material is an inorganic material.

3. The positive electrode active material according to claim 1,
wherein a mass ratio of the covering material to the lithium composite oxide is 0.2 or less.

4. The positive electrode active material according to claim 3,
wherein the mass ratio of the covering material to the lithium composite oxide is 0.01 or more and 0.1 or less.

5. The positive electrode active material according to claim 1,
wherein the covering material has a thickness of 0.1 nm or more and 2.0 nm or less.

6. The positive electrode active material according to claim 1,
wherein the covering material forms a solid solution with at least a part of the surface of the lithium composite oxide.

7. The positive electrode active material according to claim 1,
wherein the covering material is an oxide.

8. The positive electrode active material according to claim 7,
wherein the oxide is represented by a formula $Li_aA_bO_c$,
where A is at least one selected from the group consisting of Mn, Co, Ni, Fe, Cu, Nb, Mo, Ti, Al, Cr, Zr, Zn, Na, K, Ca, Mg, Pt, Au, B, P, Eu, Sm, Ce, and H; and $0 \leq a \leq 3$, $0.5 \leq b \leq 4$, and $1 \leq c \leq 4$.

9. The positive electrode active material according to claim 8,
wherein the oxide is at least one selected from the group consisting of $MnO_2$, $Al_2O_3$, $MgO$, $LiNbO_3$, and $LiBO_2$.

10. The positive electrode active material according to claim 1,
wherein the ratio satisfies 0.11 or more and 0.85 or less.

11. The positive electrode active material according to claim 10,
wherein the ratio satisfies 0.44 or more and 0.85 or less.

12. The positive electrode active material according to claim 1,
wherein the lithium composite oxide contains manganese.

13. The positive electrode active material according to claim 12,
wherein the lithium composite oxide further contains cobalt and nickel.

14. The positive electrode active material according to claim 1,
wherein the lithium composite oxide contains fluorine.

15. The positive electrode active material according to claim 1 comprising the lithium composite oxide as a main component.

16. A battery comprising:
a positive electrode containing the positive electrode active material according to claim 1;
a negative electrode; and
an electrolyte.

17. The battery according to claim 16,
wherein the negative electrode contains:
a negative electrode active material that allows a lithium ion to be inserted therein and released therefrom; or a material that allows lithium metal to be dissolved and deposited thereon, and the electrolyte is a nonaqueous electrolytic solution.

18. The battery according to claim 16, wherein the negative electrode contains:
a negative electrode active material that allows a lithium ion to be inserted therein and released therefrom; or
a material that allows lithium metal to be dissolved and deposited thereon, and
the electrolyte is a solid electrolyte.

* * * * *